United States Patent
Susin

[15] 3,661,487
[45] May 9, 1972

[54] INJECTION MOLDING APPARATUS

[72] Inventor: Victor G. Susin, Naperville, Ill.
[73] Assignee: Young Rubber Company, Naperville, Ill.
[22] Filed: Mar. 5, 1969
[21] Appl. No.: 804,532

[52] U.S. Cl..............................425/191, 425/243, 425/247
[51] Int. Cl. .........................................................B29f 1/00
[58] Field of Search ................18/30 B, 30 CV, 30 D, 30 HB, 18/30 NH, 30 NP, 30 RC, 30 RH, 30 WJ, 5 BF, 5 BI, 5 BK, 5 RS, 12 SJ, 12 SI, 17 I, 17 H, 30 L, 30 RM; 62/3; 249/79, 78; 264/328, 329

[56] References Cited

UNITED STATES PATENTS

| 1,952,241 | 3/1934 | Eckert................................18/30 LD |
| 2,471,683 | 5/1949 | Halbach..............................18/30 NH |
| 2,875,556 | 3/1959 | Vigna et al..............................249/78 |
| 3,091,812 | 6/1963 | Witkowski...........................18/30 RH |
| 3,197,342 | 7/1965 | Neild, Jr. ......................................62/3 |
| 3,354,508 | 11/1967 | Draben...................................18/30 B |
| 3,233,288 | 2/1966 | Strauss..............................264/329 X |

Primary Examiner—J. Spencer Overholser
Assistant Examiner—David S. Safran
Attorney—Alter, Weiss & Whitesel

[57] ABSTRACT

A unique temperature controlled runner system for use in conjunction with transfer and molding apparatus used for elastomers, or the like. The runner system comprises high pressure tubing coupled to extend the pressure injection system to the mold plate cavities. The high pressure tubing is surrounded by heat exchanging means designed to control the temperature within the tubing and the molds.

4 Claims, 7 Drawing Figures

INVENTOR
VICTOR G. SUSIN

BY
Alter and Weiss
ATTORNEYS

INVENTOR
VICTOR G. SUSIN

BY
*Alter and Weiss*
ATTORNEYS

INJECTION MOLDING APPARATUS

This invention is concerned with molding apparatus, and more particularly, the runner systems used in molding apparatus especially when such apparatus is used for molding thermosetting elastomer material. Natural rubber is a prime example of such a material.

Presently available apparatus used in transfer molding, injection molding and combination of transfer and injection molding include runner systems. The runner systems are located between hot plates and include runner channels through which the plasticized material is passed to the mold cavities from the cylinder of the molding apparatus.

The cylinder receives the raw material and is equipped with external means for preheating the material to maintain it in a plasticized condition. Pressure is applied to the material to force it into the mold cavities. For example, a ram or plunger is provided which fits into the inner circumference of the cylinder and forces the material within the cylinder through the cylinder nozzle, the runners of the runner plates and into the mold plate cavities.

The mold plates are held together while the material is being forced into the cavities and are maintained juxtaposed until the material sets at a certain given temperature. Then, the mold plates are separated and the molded products are removed from the mold plate cavities. The set material that is in the runner system is also removed and discarded. If the material being molded is thermoplastic, that is it has characteristics whereby it can be reheated and replasticized, this is done and wastage is minimized. In the case of a thermosetting material such as rubber where once the material has been set it cannot be further plasticized, then the discarded runner material is wasted.

Many schemes are known to avoid the waste of the thermosetting material in the runner system. One scheme, for example, uses heating coils within the mold plates to maintain the thermosetting material in a plasticized condition. That is, the heating coils control the temperature of the portion of the mold contiguous to the runner system to maintain the runner system at slightly below the cure temperature. This method has not proven satisfactory because of the cumbersome and inefficient apparatus that has been deemed necessary to heat the runner block.

Another known system for preventing the setting of the material in the runner is the use of valves to control the amount of material injected into the molds. This system is used primarily for saving the runner waste known as "sprue" but has proved to be relatively inefficient.

Accordingly, an object of this invention is to provide a new and unique runner system for molding apparatus.

Another object of this invention is to provide a runner system that will minimize sprue drool.

Yet another object of this invention is to provide a unique and variable runner system which can be easily altered to operate in conjunction with a number of different molds.

Still another object of this invention is to provide a runner system which can be used to transfer heat to the rubber contained in the runner system and conversely to carry away heat from the surrounding hot plate.

Actually, this invention provides a system which improves on known runner systems by eliminating the costly waste caused by material setting in the runner cavities. The invention thus, also minimizes the cost of continuously cleaning the runner systems to remove set material.

A preferred embodiment of the invention comprises a runner system which is a removable extension of the high pressure system of an injection cylinder. The runner system includes high pressure tubing that is coupled to the orifice or sprue of the well known injection molding cylinder and that extends to the mold cavities. The tubing is surrounded by heat transferring means for carrying heat to and from the high pressure tubing and surrounding environment to maintain the plasticized material in the runner at a specified temperature. The high pressure tubing is arranged so that additional high pressure tubing sprues can easily be added or removed from the system to enable the system to be tailored to fit a variety of molds having different multi-cavity systems. The means for heat exchanging is either accomplished thermoelectrically or using means for carrying recirculating hot oil, water, gases or any other applicable medium.

These and other objects and features of the invention will now be explained in detail with the aid of the accompanying drawings wherein.

Figure 1:
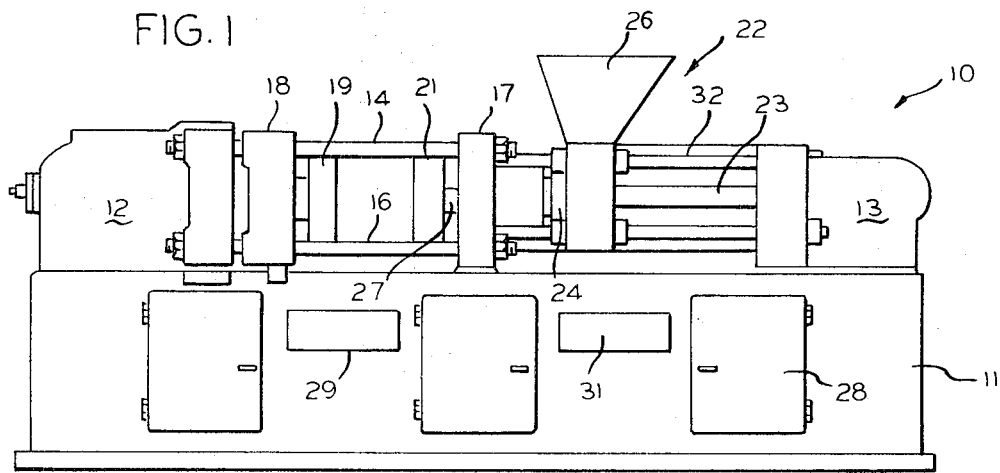
FIG. 1 is a block diagram showing the essential parts of an injection molding machine.

Referring now to the drawings, like characters of reference illustrate corresponding parts throughout. FIG. 1 shows in a block form designated by numeral 10, a typical injection molding machine which may incorporate the inventive molding apparatus. The machine is shown as having a base 11 upon which are mounted two opposing cylinder housings 12 and 13. Removable tie rods, such as rod 14 and 16 extend from cylinder housing 12 to a die head plate 17. A clamp platen 18 is located adjacent to the end of cylinder housing 12 and mounted to the tie rods. Movably mounted in the tie rods are mold halves 19 and 21. Mold half 21 is secured to the die head plate 17. A ram telescopes from cylinder housing 12 and forces mold half 19 into contiguous relationship with mold half 21 when the machine is so actuated.

Injection molding machines are generally actuated hydraulically. However, any other mode of actuation that is well known to those skilled in the art may be used.

The injection unit generally depicted as 22 on the right side of the machine 10 cooperates with the molds. The injection unit consists of the cylinder housing 13 from which a ram or screw 23 extends into an injection cylinder 24 to pressurize the plasticized material in the cylinder. Mounted directly adjacent and integral to the cylinder 24 is hopper 26 used to feed raw material into the injection cylinder. An injection cylinder extension or sprue shown as 27 reaches from die head plate 17 to mold half 21.

Also schematically shown on the base are doors or access openings, such as covered access opening 28 to enable servicemen to service and clean the machine. In addition block diagram 1 indicates controls for controlling the operation of the machine as generally depicted by rectangle 29 and gauges for showing various temperature and pressure conditions depicted by rectangle 31.

Tie rods are also shown extending between cylinder 13 and the injection cylinder 24. For example, one of the tie rods is designated by numeral 32. While this machine is shown as performing the injection operation on a horizontal plane, it should be understood that a verticle type injection molding machine or a transfer molding machine could also be used within the scope of this invention. The machine 10 of FIG. 1 is shown in cursory manner merely to orient those skilled in the art to the metes and bounds of the invention.

Figure 2:
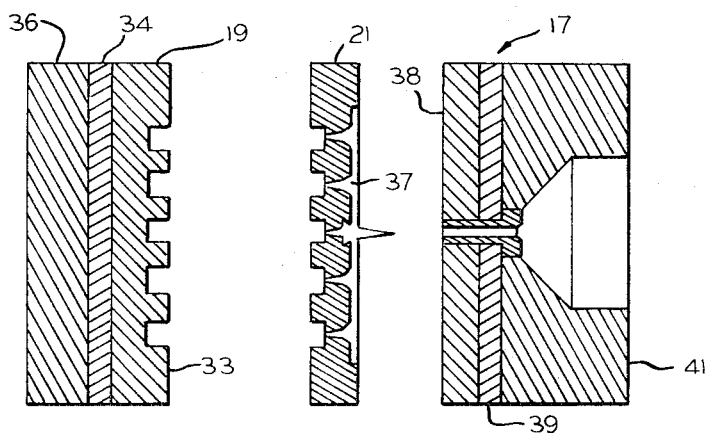
FIG. 2 shows in a sectional view mold plates and associated platens used in presently available injection apparatus.

FIG. 2 shows mold plates and the die head platen which are generally presently used in the machine 10 of FIG. 1 as an aid in understanding the present invention. The movable mold half is shown on the left side of FIG. 2. It comprises the actual mold plate 33. Juxtaposed to the mold plate is a hot plate 34 designed to maintain the mold plate at the temperature necessary to cure the material being molded. A moving die set platen 36 is coupled to the ram extending from cylinder 12 and clamp platen 18. The fixed half of the mold plate 21 shows runners 37 machined into the mold plate extending to each of the cavities of the mold.

Figure 3:
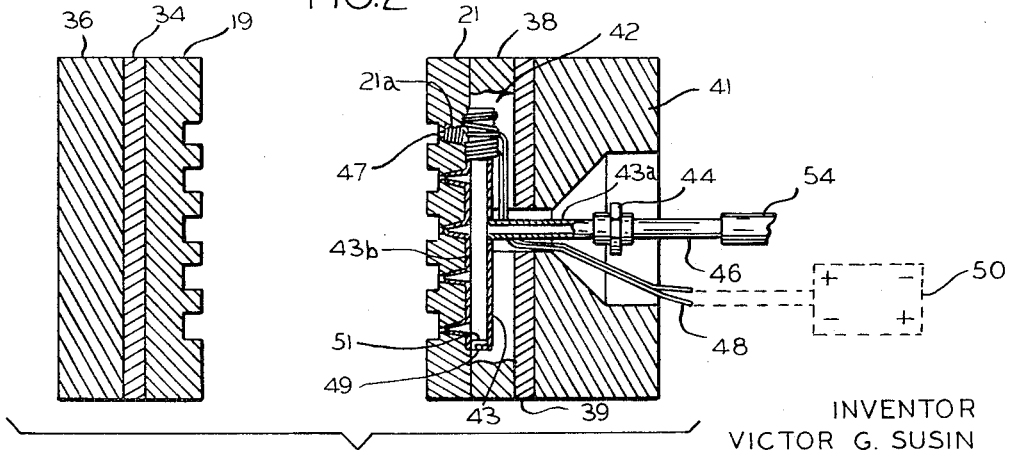
FIG. 3 shows a sectional view of the inventive runner system and associated mold plates and platens.

The die head platen 17 comprises a sprue plate 38, a hot plate 39 and a cylinder conforming sprue plate 41. The cylinder conforming sprue plate 41 is designed to receive the cylinder and the orifice sprue extending therefrom when the material is being injected into the mold. As shown in FIG. 3, during operation the fixed mold half 21 is held firmly against the sprue plate 38 so that the sprue orifice of the sprue plate extends directly into the runner slots of mold half 21.

As previously pointed out, a drawback in the use of this equipment is that when the rubber sets in the runner system it is forever lost and must be discarded as waste. Thus, it is advantageous to keep the rubber from setting in the runner system. An additional advantage of keeping the rubber from curing in the runner system is that it enables rubber from the runner system to flow into the cavity.

Figure 4:
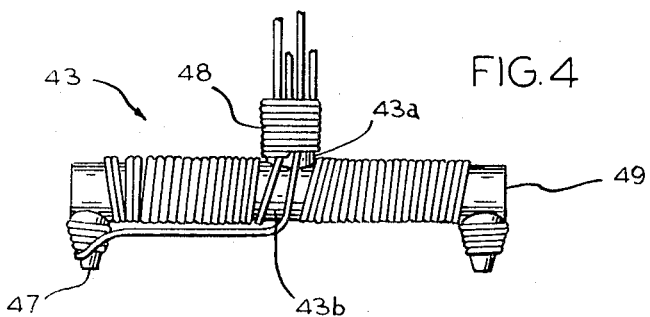
FIG. 4 is a pictorial view of runners made in accordance with this invention.

FIG. 3 shows the inventive runner system, shown pictorially in FIG. 4, as used on a machine such as that shown in FIG. 1. The designation numerals used in FIG. 3 are the same as those used in FIG. 2 wherever possible. For example, there is a moving platen 36, hot plate 34 and a mold plate 19 having mold cavities therein. The fixed or stationary mold plate 21, however, is devoid of runner slots. Instead, separate runner system generally shown by designation number 42 is placed into appropriate cavities in the sprue plate 38. A hot plate 39 is sandwiched between the sprue plate 38 and the cylinder receiving plate 41. Thus, instead of the well known runner system, the new runner system 42 comprises high pressure tubing 43 extending from a coupling 44 which connects to the injection cylinder tubing 46.

The high pressure tubing 43 comprises an inlet section 43a and a manifold section 43b which ends in a plurality of sprues, such as sprue 47 leading into the cavities of the fixed mold half 21. The mold half 21 has cavities therein such as cavity 21a for receiving the sprues. Surrounding the high pressure tubing 43 there is shown heat exchanging means such as low pressure tubing 48 which may be used to carry pre-heated recirculated fluid for maintaining the temperature in the high pressure tubing to be sure that the elastomer in the high pressure tubing does not set. The low pressure tubing 48 is helically wound around the high pressure tubing 43 within the block 38. The ends of the high pressure tubing, such as end 49, are preferably equipped with means such as removable plugs to facilitate cleaning of the unique runner system and for making it possible to add still more manifold sections if a differently shaped or a longer fixed mold half is used. Thus, the end 49 contains plugs 51 which fit into the pipe threaded end 49. It should be understood that caps could be used instead of plugs or combinations of caps and plugs could be used to block the ends of the manifold section.

A simple runner containing only two sprues is shown in FIG. 4 in pictorial form. Therein, two pairs of low pressure tubing are shown. The tubing is wound around the high pressure tubing commencing at the inlet portion 43a and continuing to the sprue of the manifold section 43b. The low pressure tubing includes inlet and outlet tubing for carrying the fluid to and from the tubing 43. Further sprues can be added by adding high pressure manifold sections to the ends such as end 49. The newly added sections can, of course, be at angles to the original manifold section or in line therewith.

Figure 5:
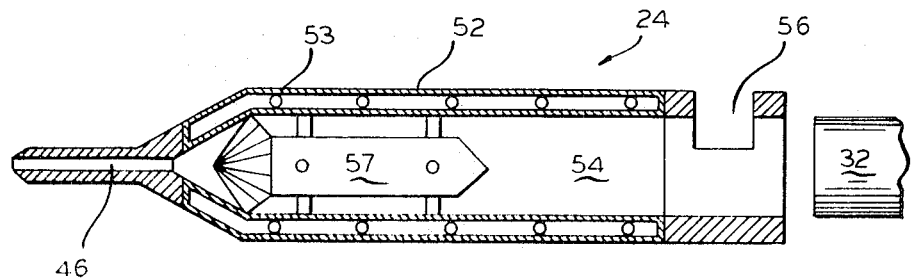
FIG. 5 shows in a sectional view pertinent details of an injection cylinder which may be used in conjunction with the inventive runner system.

FIG. 5 shows a typical injection cylinder 24. The cylinder comprises means for pre-heating and/or cooling the material such as a water jacket 52. The water jacket contains low pressure tubing 53 wound around the cylinder 54. The cylinder 54 itself is shown having a smooth bore section. The elastomer material is fed into the smooth bore cylinder from the hopper 26 through opening 56 to apply pressure to force the preheated plasticized material that is being injected through the orifice or sprue 46 of the cylinder into the runner system and through the runner system into the mold cavities where it is formed. The runner system is coupled to the cylinder with any well known pipe coupling such as that shown at 44 in FIG. 3. The cylinder is shown equipped with a torpedo 57 for thinning out the elastomer material to assure uniform heating. It should be understood that while a cylindrical bore is described, and a torpedo is shown in the cylinder, this particular machine and apparatus is described only by way of example.

The low pressure heat exchange tubing 48 may be coupled to the tubing 53 of the water jacket to obtain the heat carrying fluid therefrom. Alternatively, an independent heat supply system can be used for supplying the tubing with the heat exchanging fluid medium.

Figures 6, 7:
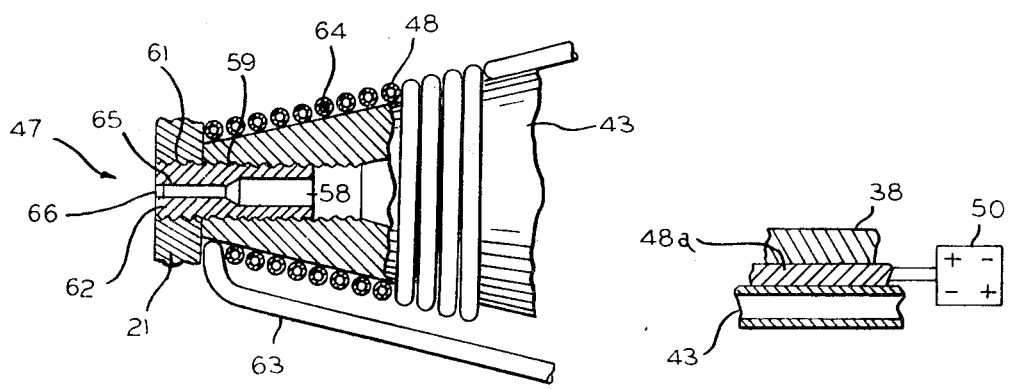
FIG. 6 shows sprue details of the inventive runner system.
FIG. 7 is a partial view of the runner system of FIG. 3 using thermoelectric heating elements for temperature control.

FIG. 6 shows details of the sprues of the unique runner system, such as sprue 47, for example. As shown in FIG. 6, the high pressure tubing end is depicted as number 43 and is shown surrounded by the low pressure heat exchange medium such as the fluid carrying tubing 48. It should be understood that many other types of heat exchange devices could be used. For example, a water jacket, fabricated fins, water lines, and thermoelectric devices can be used. The sprue end of the high pressure tubing is threaded as shown at 59. In addition, the portion of the mold in which the sprue extends is also threaded, such as shown at 61. A threaded bushing 62 is threaded into the mold 21 and the high pressure tubing to maintain a contiguous relationship between the sprue of the high pressure tubing and the mold cavities. The orifice 65 which is an extension of orifice 58 has a diameter-to-length relationship designed to minimize sprue drool.

As shown in FIG. 6, fluid carrying tubing is used having supply lines shown at 63 and a return line shown by the cross 64.

Alternatively, the temperature of the runner system can be maintained with heat exchange means comprising thermoelectric devices. The utilization of thermoelectric devices for temperature control is discussed in an article entitled "Temperature Control With Thermalelectrics" by William R. Stubstad printed in the September, 1961 edition of the trade magazine, Control Engineering. As shown in FIG. 7, the high pressure tubing 43 can be surrounded by thermoelectric material 48a rather than fluid carrying tubing. The thermoelectric material is then contiguous to runner plate 38 which is maintained at a higher temperature than the temperature of the runner. The thermoelectric material takes advantage of the Peltier effect and comprises junctions of two dissimilar metals. When electric current passes through the junctions in a first direction then one junction cools while the other heats. A reversal of current causes the warm junction to cool and the cool junction to heat. Thus, the thermoelectric material is ideal for maintaining the plasticized material at a desired temperature since a power supply generally indicated as 50 (see FIG. 3) can be used to selectively supply current in a forward or reverse direction as desired to heat or cool the plasticized material as required.

In operation the unique runner 42 is placed into the cavity of block 38 and the threaded bushing 62 is inserted to hold the sprue of the runner system 42 in contiguous relationship with the mold half 21. A threaded bushing may have a slot therein such as slot 66 for receiving a screw driver, or the like, to facilitate inserting the threaded bushing to hold the permanent relationship between the high pressure tubing of runner 42 and mold half 21. Coupling 44 is tightened to connect the runner 42 to the orifice 46 of cylinder 54.

Raw material from hopper 26 is allowed to enter the cylinder chamber 54 and the ram or screw 32 is forced into the cylinder to apply high pressure to the material. The material is pre-heated while in the cylinder to bring it to a plasticized condition by a fluid in the water jacket or piping surrounding the cylinder. When the material is in its plasticized condition, the ram or screw is actuated to cause the plasticized material to flow through the orifice 46, through coupling 44 into the tubing 43 of the runner system 42.

The heat exchange apparatus of the runner system is actuated to maintain the temperature of the plasticized material to prevent the plasticized material from setting in the runner system. In practice, for example, if rubber is the material, the runner system is maintained at approximately 200° F. while the molds are maintained at 400° F. The rubber cures at 300° F.

Under pressure the movable mold portion 33 is moved into juxtaposed position with the stationary plate 21 through the operation of the rod coming from cylinder 12. The plasticized material flows into the cavities and is maintained in the cavities under pressure. It is removed from the hot plate after the material in the cavities cures or sets. The heat exchanging device of the runner system acts to maintain the material in the runner system in its plasticized condition.

The mold halves are moved apart and the molded set material is removed from the mold cavities. The material is maintained in its plasticized condition in the runner system by the heat exchange medium of the runner system and thus, there is no wasted material. In addition, the runner system disclosed is separately maintained at a particular temperature which is therefore easier to control.

While the principles of the invention have been described above in connection with specific apparatus and applications, it is to be understood that this description is made only by way of example and not as a limitation on the scope of the invention.

I claim:
1. Molding apparatus for use with thermosetting elastomer materials,
   said molding apparatus for use in molding machines comprising a movable mold plate and a stationary mold plate,
   means for actuating the movable mold plate into juxtaposition with the stationary mold plate,
   means for inserting plasticized elastomer material into cavities in the said mold plates under pressure,
   said fastening means comprising a separate runner system,
   the runner system being fabricated from high pressure tubing and being independent of the platen of the molding machines,
   said separate runner system further comprising inlet high pressure tubing,
   manifold high pressure tubing means connected to said inlet high pressure tubing,
   at least one runner sprue integral to said manifold high pressure means for transferring the plasticized material in the high pressure tubing under pressure to the mold cavities,
   said fixed mold plates comprising retaining means for retaining said at least one runner sprue of said runner system in said receiving means,
   said retaining means comprising first screw thread means in said receiving means,
   said at least one sprue comprising orifice means having second screw threads therein,
   bushing means for threading into both said receiving means and said orifice means for retaining said at least one sprue in said receiving means, and
   screw driver slot means at one end of said bushing for use in inserting and removing said bushing means.

2. The molding apparatus of claim 1, wherein said separate runner system has heat exchanging means associated therewith to maintain the material in the runner system below the temperature of the mold for preventing the elastomer material in the separate runner system for setting.

3. The molding apparatus of claim 1, wherein means are provided for varying the manifold high pressure system means to increase the number of sprues in the configuration of the separate runner system to fit different molds.

4. The molding apparatus of claim 2 wherein said means for varying the size and configuration of said manifold means comprises pipe threads at the ends of the said manifold high pressure means enabling the interconnection of more than one of said manifold means, and
   means for blocking the threaded ends of said manifold means not connected to other manifold means.

* * * * *